INVENTORS
JOSEPH FEITLER
ROBERT J. BETZ
ATTORNEY

United States Patent Office 3,296,608
Patented Jan. 3, 1967

3,296,608
DIGITAL PULSE INFORMATION READOUT
AND CONVERSION TO DISPLAY
Joseph Feitler, Moorestown, N.J., and Robert J. Betz, Ferndale, Md., assignors, by mesne assignments, to the United States of America as represented by the Secretary of the Navy
Filed Sept. 20, 1963, Ser. No. 310,510
12 Claims. (Cl. 340—324)

This invention relates to a digital-to-digital converter and more particularly to a converter for transforming recorded sea surface scan data into a visual display.

Knowledge of the sea state or waveform of the sea above a submerged submarine is a necessary and sometimes critical requirement for successful underwater operation of a submarine. One system for determining the waveform of the sea above a submerged submarine at any given time comprises a network of nine sonar transducers disposed along the surface of the submarine. Each of the transducers sequentially generates a pulse initiated by a transmitted sonar signal and terminated by the reception of the reflected sonar signal from the undersurface of the water. The width of each pulse generated by the transducer is then proportional to the time required for the sonar signal to travel to the surface of the water and back, and therefore, is proportional to the depth of the particular transducer. The generated pulse of the transducer gates a frequency oscillator to provide a packet of pulses of a number which corresponds to the depth of the transducer below the surface of the water.

The nine transducers disposed along the surface of the submarine generate pulses in sequence starting from transducer #1 to transducer #9 and repeating cyclically. With proper switching and control circuitry the information contained in each pulse jacket of each transducer may be visually indicated on a readout device. By such a system, inhabitants of a submerged submarine may be apprised almost instantaneously of the particular sea state of waveform of the sea above the submarine.

The above-mentioned system for displaying sea data, aside from displaying sea data also records such sea data on magnetic tape for future use in the laboratory or as a training aid. Such taped information is useful for data reduction and provides a method for complete study of the above-discussed system and also may serve as a permanent record or history of a particular sea state in existence at a particular time.

The present invention contemplates a system which utilizes the data recorded on the magnetic tape to recreate the display of the sea state in a manner identical to or closely resembling the original display in the submarine. The digital-to-digital converter of the present invention is the apparatus used to recreate the original display.

In actual practice the digital-to-digital converter of the present invention receives surface scan data from the magnetic tape recordings and displays it by means of a transducer depth readout device similar to the one utilized in a submarine. The transducer depth readout may be corrected for transducer height relative to the mean keel depth by a normalization process. The correction for transducer height relative to mean keel depth takes into account the unequal heights at which each of the nine transducers disposed along the uneven contours of the submarine surface.

The digital-to-digital converter of the present invention also recognizes and corrects for failure of the tape to record pulse packets which may not have been detected or recorded in the submarine. The digital-to-digital converter of the present invention further recognizes and corrects for error where the pulse packets associated with one transducer overlap the pulse packets associated with the next adjacent transducer as recorded on the tape.

The general purpose of the present invention is to recreate the display of the sea waveform above the submarine as originally displayed on the readout device in a submarine. The display panel used in this invention is the same as the one used in a submarine and comprises nine columns of fourteen lights each. Each column is associated with one of the transducers on the submarine and the combination of lights energized in each column indicates the depth in feet of its associated transducer at a particular instant in time.

The magnetic tape used in this invention comprises two channels. One channel contains a continuous, sequential and cyclically repeating recording of the pulse packets associated with transducers 1 through 9. The other channel contains a sync pulse which occurs after the ninth pulse packet in sequence or the pulse packet associated with transducer #9.

The switching, control, and timing circuitry required to provide the correct column in the display panel with the information contained in the pulse packet identified with each transducer forms the subject of the present invention.

Therefore, it is an object of the present invention to provide a system to recreate in visual form the waveform of the sea above a submerged submarine as originally displayed in the submarine.

Another object of the present invention is to provide a digital-to-digital converter for reproducing in visual form surface scan data as originally recorded by surface scan apparatus in a submarine.

A further object of the present invention is to provide a digital-to-digital converter for recreating in visual form the waveforms of the sea above a submerged submarine as originally displayed in the submarine from a magnetic tape simultaneously recorded with the surface scan data at the time of the original display in the submarine.

Still another object of the present invention is to provide switching, control, and timing circuitry necessary for displaying at particular positions on a display panel the depth of a particular one of a plurality of transducers from depth information as recorded on a magnetic tape.

Yet another object of the present invention is to provide a digital-to-digital converter for displaying in visual form and in proper sequence the depth of each of a plurality of transducers as recorded in sequence on magnetic tape.

A still further object of the present invention is to provide a matrix switching circuit as part of the present invention for switching taper ecorded data of particular pulse packets for display on a particular portion of a display panel.

Other objects and many of the attendant advantages of this invention will be readily appreciated as the same becomes better understood by reference to the folowing detailed description when considered in connection with the accompanying drawings wherein.

Figure 1:
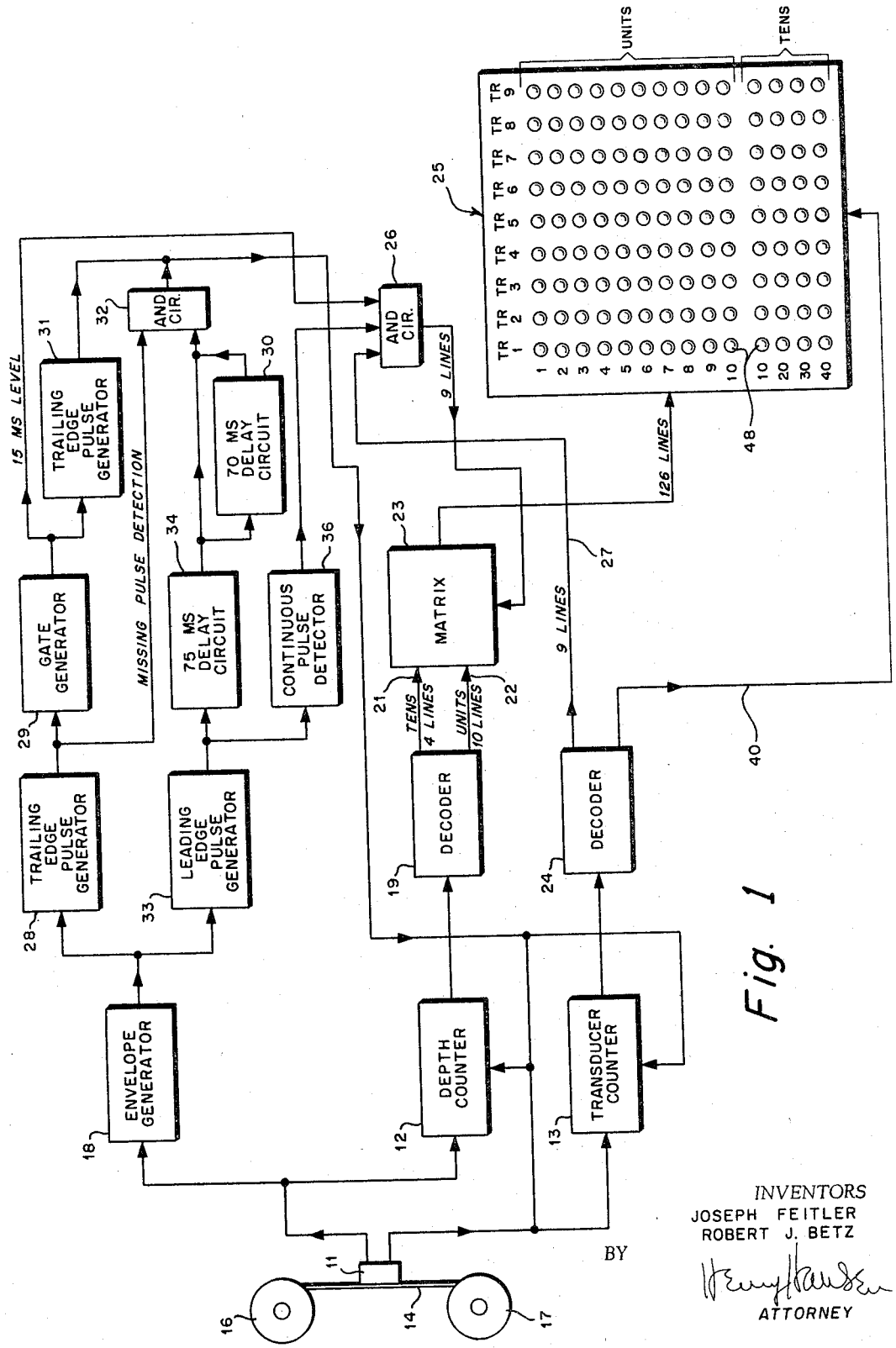
FIG. 1 illustrates in block diagram form a preferred embodiment of the invention.

Referring now more particularly to the digital-to-digital converter shown in FIG. 1, there is illustrated a magnetic detector head 11 having one output terminal connected to depth counter 12 and the other output terminal connected to transducer counter 13. Detector head 11 is disposed in rubbing relationship with a magnetic tape 14 which is disposed on a conventional tape transport mechanism comprising a supply reel 16 and a takeup reel 17. Reel 17 is driven at a takeup speed substantially equal to the speed at which information was recorded on the tape. The particular apparatus for driving the takeup reel 17 forms no part of this invention and, therefore, is not shown. The drive apparatus, however, may comprise one of the numerous conventional tape transport drives known to the prior art.

Tape 14 has two recorded channels thereon. One channel contains a record of the pulse packets generated by nine transducers disposed on the surface along the length of a submarine. On the submarine each transducer 1 through 9 is switched on and off in sequence and such switching is repeated cyclically. During the ON time each transducer generates a pulse packet in which the number of pulses is proportional (for example, one pulse equals one foot) to the depth of that particular transducer below the surface of the water. These pulse packets are cyclically recorded in sequence on the one channel of the magnetic tape. Aside from recording these pulse packets, display apparatus within the submarine indicates the depth measured by each transducer for each of its ON times.

The second channel of the tape contains a sync pulse which occurs after each of the pulse packets associated with the ninth transducer. The channel containing the pulse packets is connected via the magnetic head 11 to the depth counter 12 wherein the individual pulses in each pulse packet are counted. This channel is also connected to envelope generator 18 which generates the envelope of each pulse packet fed to it.

Depth counter 12 which is of the binary-coded decimal type is connected to decoder 19 wherein the binary count of depth counter 12 is changed to decimal form. Decoder 19 provides as an output the count of depth counter 12 in decimal form, that is, tens and units. Cable 21 which provides the tens output from decoder 19 as an input to matrix 23 in actuality consists of one conductor for each tens count of which depth counter 12 is capable. For purposes of illustration, it has been assumed that depth counter has a maximum tens scale of 40. Therefore, the actual number of conductors in cable 21 would be four for each corresponding to a tens count, that is, 10, 20, 30 or 40. These conductors are connected to conductors L11–L14 of the matrix circuit shown in FIG. 2 and which is to be more fully described hereinbelow. Cable 22 which provides the units output from decoder 19 to matrix 23 is composed of ten conductors connected to conductors L1–L10 of FIG. 2 with each conductor corresponding to one of the unit counts 1 through 10. If each pulse in a pulse packet is equivalent to one foot, the maximum count of which depth counter 12 is capable would be fifty feet. If the actual depth is greater than fifty feet, depth counter 12 may easily be adjusted to compensate. For example, if the actual depth were in the 60 to 110 feet range, the depth counter 12 could easily be adjusted so as to start counting at 60 instead of 0. Thus, decoder 19 may effectively provide after each count of the pulses of each pulse packet is complete an input to matrix 23 through one of the conductors in cable 21 and through one of the conductors in cable 22.

Display panel 25 comprises nine columns of fourteen lights each. Each column is associated with a particular one of the transducers 1–9, e.g., the recorded count of pulses in the pulse packet associated with transducer #4 in the submarine will be indicated by a particular combination of lights energized in column 4. Nine groups of fourteen conductors each connect matrix 23 to display panel 25. Each of the conductors in one group is connected to a light energizing circuit of one of the lights in a column. Transducer counter 13, which is a binary-coded decimal counter, is connected to decoder 24 which is a binary-to-decimal type decoder. Cable 27 which comprises nine conductors connects the output of decoder 24 to "and" circuit 26. The transducer counter 13 synchronizes the proper transducer column on the display panel with its associated pulse packet when its count is advanced by one after its readout. A pulse which is generated 15 microseconds after the termination of a pulse packet advances the count of transducer 13 by one. The manner in which this pulse is generated will be explained more fully hereinafter. The sync pulse recorded on the channel of the magnetic tape connected to transducer counter 13 resets transducer counter 13 to the "one" state when the count of nine is reached in the transducer counter. This sync pulse becomes significant where for some reason the pulse generated 15 microseconds after happens to be missing.

As aforesaid, envelope generator 18 generates an envelope having a pulse width defined by the beginning and the end of each packet of pulses. The output from envelope generator 18 is connected to trailing edge pulse generator 28 which generates a pulse in response to the trailing edge of the envelope pulse. The output of trailing edge generator is connected to a special "and" circuit 32 and to gate generator 29. In response to the pulse output from trailing edge pulse generator 28 gate generator 29 generates a pulse of 15 microseconds duration. This pulse is fed as one of the inputs to "and" gate 26. The output of gate generator 29 is also fed to trailing edge pulse generator 31 which provides a pulse output in response to the trailing edge of the 15-microsecond pulse. The output terminal of trailing edge pulse generator 31 is connected to transducer counter 13 and to depth counter 12. It is this pulse from trailing edge pulse generator 31 which advances the count of transducer counter 13 by one after each readout of the count in depth counter 12. This pulse also is used to reset the count of depth counter 12 to one.

The output from envelope generator 18 is also connected to leading edge pulse generator 33 which provides a pulse in response to the leading edge of the envelope pulse. The output of leading edge pulse generator 33 is connected to "and" circuit 32 through 75-microsecond delay circuit 34. The output of delay circuit 34 is also connected to "and" circuit 32 through 70-microsecond delay circuit 30.

As aforesaid, the output from trailing edge pulse generator 31 which is indicative of the end of the 15-microsecond pulse from gate generator 29 is utilized to advance the count of transducer counter 13 by one and also to clear depth counter 12. This assures the transducer counter 13 will always be in the proper count state to supply matrix 23 through "and" circuit 26 an output on the proper conductor in cable 27 to thereby permit the count from depth counter 12 which is indicated on the display panel 25 to be identified with the proper transducer.

If for some reason a pulse packet is missing on the tape, envelope generator 18, of course, will not generate an envelope pulse. Obviously then trailing edge pulse generator 31 cannot provide an advance pulse to transducer counter 13 or a clear pulse to depth counter 12. If no provision is made for this situation, it is apparent that the proper transducer would not be associated with the proper pulse packet on the display panel 25.

Figure 3:
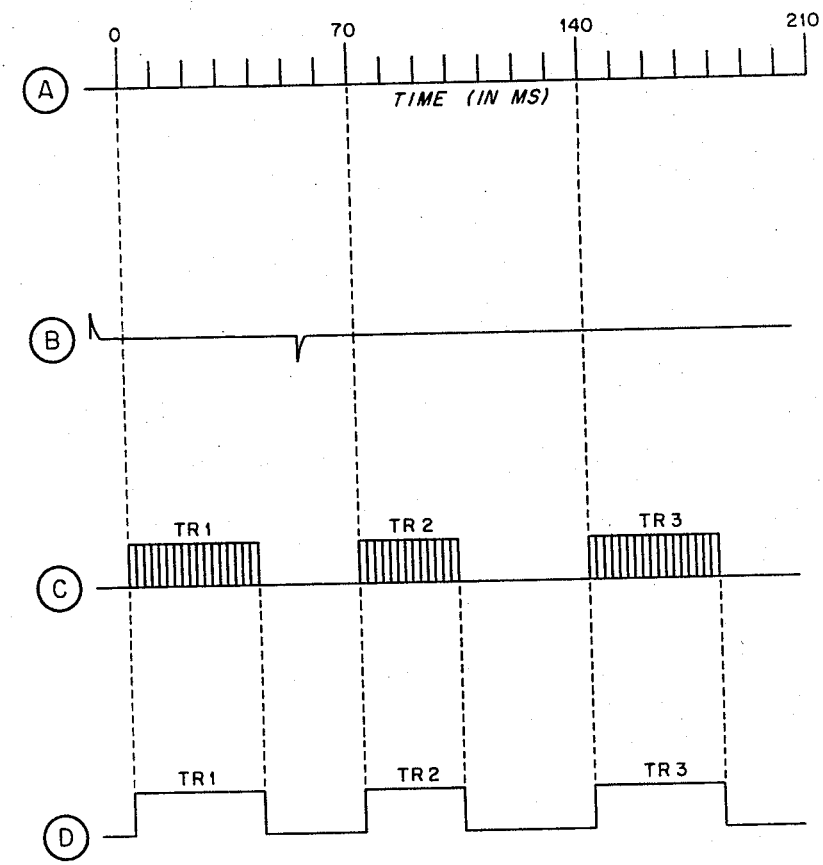
FIG. 3 is a timing chart useful in the explanation of the present invention.

Since the time between the start of successive pulse packets is approximately known, the presence of a pulse packet can be determined by a time comparison between the packet and the one preceding it. Line C of FIG. 3 illustrates the pulse packets associated with first three transducers as recorded on the tape. Comparing line A, which is time in microseconds, with line C it may be seen that the maximum period for any pulse packet is 70 microseconds. Considering the situation where the pulse packet associated with transducer 2 as shown on line C of FIG. 3 were missing from the tape such must be detected and corrected for. In this situation, the envelope associated with transducer 2 illustrated in line D of FIG. 3 would also be missing. However, the leading edge of the envelope associated with transducer #1 as recorded on the tape would be delayed by 75 microseconds in delay circuit 34 before application to "and" circuit 32. By reference to FIG. 3 it may be seen that the delay pulse from delay circuit 34 occurs 5 microseconds after the time that the pulse packet associated with transducer #2 should have occurred. If the envelope associated with pulse packet of transducer #2 is not present, the pulse from delay circuit 34 passes through "and" circuit 32 and advances the count of transducer 13 by one. Thus, it may be seen that where the pulse from pulse generator 31 is not available to advance the count of transducer counter 13 due to the lack of a pulse packet on the tape or other reason, the pulse from delay circuit 34 performs this function.

The pulse output from delay circuit 34 also triggers 70-microsecond delay circuit 30. The pulse from delay circuit 30 occurs 5 microseconds after the pulse packet associated with transducer #3 should have occurred. Thus, if the pulse packet and therefore the envelope associated with transducer #3 is missing, this is also detected and corrected for. The pulse from delay circuit 30 is fed to transducer counter 13 and depth counter 12 and even if two pulse packets in a row are missing from the tape, transducer counter 13 will still be advanced and depth counter 12 will be cleared in readiness for the next count and readout.

In any event, whether pulse packets in a cycle are missing or not the sync pulse contained on the tape recording will reset transducer counter 13 to its one state and clear depth counter 12 after every ninth pulse.

Occasionally in the submarine the return or reflected pulse of the sonar pulse emitted by the transducer fails to turn off the transducer thereby resulting in the recording on the tape of a continuous pulse packet. The present invention provides a means for identifying this packet containing meaningless data and preventing it from reaching its associated column on the display panel. This is accomplished by means of a continuous pulse detector 36 which is connected to the output terminal of leading edge pulse generator 33. Continuous pulse detector 36 provides an output pulse some predetermined maximum time after the occurrence of the leading edge of the pulse packet envelope in question. If the trailing edge of the pulse packet does not occur before the output from continuous pulse detector 36 occurs, the pulse from detector 36 which is applied to "and" gate circuit 26 will nullify the gating effect of the 15-microsecond pulse from gate generator 29.

Figure 2:
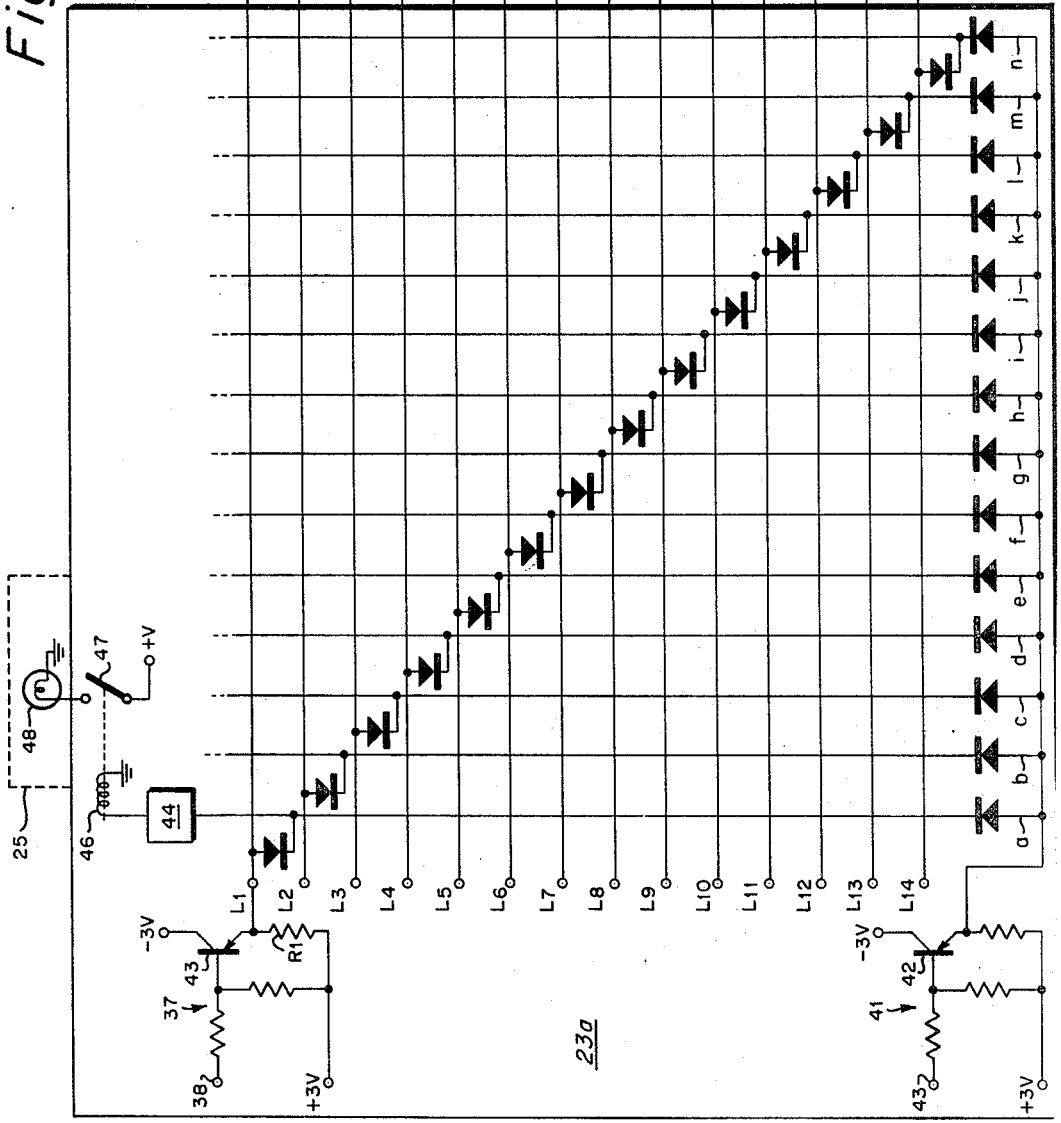
FIG. 2 illustrates in schematic form the details of one of blocks of FIG. 1.

FIG. 2 illustrates matrix 23 in schematic detail. As may be seen from the drawing, matrix 23 comprises 14 horizontal lines $L_1$ through $L_{14}$ with the $L_1$ through $L_{10}$ lines representing the units counts as provided by decoder 19 and the $L_{11}$ through $L_{14}$ lines representing the tens count as provided by decoder 19. The lines $L_1$ through $L_{10}$ are provided to matrix 23 through cable 22 and the lines $L_{11}$ through $L_{14}$ are provided to matrix 23 by means of cable 21. In each line $L_1$–$L_{14}$ there is interposed a transistor switching circuit 37 only one of which is shown. It should be understood, however, that each of the lines $L_1$ through $L_{14}$ has interposed between decoder 19 and matrix 23 a transistor switching circuit identical to transistor switching circuit 37. In actual practice it is the base terminal 38 which is connected to respective conductors in cable 21 or 22. The actual count of depth counter 12 will determine which of the lines $L_1$ through $L_{14}$ have a voltage thereon. For example, if depth counter 12 has counted 21 pulses lines $L_1$ and $L_{12}$ will be energized. When line $L_1$ has been energized, it means that one of the conductors in cable 22 associated with units count one applies a voltage to terminal 38 of transistor switching circuit 37 to thereby cause transistor 39 to become conductive and place the voltage across resistor $R_1$ onto line $L_1$.

As aforesaid, decoder 24 provides an output over one of the conductors in cable 27 depending on the count in transducer counter 13 as an input to matrix 23 through "and" circuit 26. The 15-microsecond pulse from gate generator 29 gates "and" circuit 26 to permit conduction therethrough. FIG. 2 illustrates the circuitry associated with that conductor in cable 27 which is associated with transducer #1 or the one count in transducer counter 13. This circuitry comprises a transistor switching circuit 41 having an output terminal connected to all of vertical conductors $a$ through $n$. When transducer counter 13 registers a one count, the associated conductor in cable 27 provides a voltage at terminal 43 of transistor switching circuit 41 thereby turning transistor 42 conductive and applying a voltage to each one of conductors $a$ through $n$. As aforesaid, the application of a voltage to terminal 43 is conditioned on the presence of 15-microsecond pulse from gate generator 29.

It should be noted that there is an identical circuit arrangement for each of the conductors in cable 27. Thus, it should be noted that matrix 23 actually contains nine groups or submatrixes $23a$–$23i$ or one for each conductor in cable 27. Each of the lines $L_1$ through $L_{14}$ extend through and connects to the vertical conductors $a$–$n$ of each group $23b$–$23i$ in the same manner in which they are connected to the vertical conductors $a$–$n$ of group $23a$ as shown in FIG. 2.

Each of the vertical conductors $a$–$n$ of each group $23a$–$23i$ contains a driver transistor 44 having an output terminal connected to ground through relay coil 46. When a voltage is applied to driver transistor 44, relay coil 46 is energized to close switch 47 to energize light 48 as shown. For the situation where the count in transducer counter 13 is one, that is, where the recorded pulse packet associated with transducer #1 is the one counted by depth counter 12 some combination of the lights on the display panel in column 1 will be lit. Since each of the vertical lines $a$ through $n$ has associated therewith one light, the particular combination of lights lit will indicate the count of depth counter 12 in the proper column for the pulse packet associated with any given transducer. For example, when transducer counter 13 has therein a count of one and depth counter 12 has counted 21 pulses in the associated pulse packet, the lights defined by horizontal conductor $L_1$ and vertical conductor $a$ will be lit in conjunction with the light defined by horizontal conductor $L_{12}$ and vertical conductor 1. The readout will then be 21 in column one of display panel 25 indicating a depth of 21 feet.

When the pulse from trailing edge pulse generator advances transducer counter 13 by one, the next count depth counter 12 will be indicated by a combination of lights in column #2. This process continues on for each count of transducer counter 13 up through nine whereupon it recycles.

The diodes shown in vertical lines $a$ through $n$ prevent coupling of the voltage present on the associated horizontal conductors $L_1$ through $L_{14}$ back into transistor switching circuit 41. Likewise, the diodes connecting the horizontal and vertical conductors as shown prevent coupling back of voltage into transistor switching circuit 37.

Various means may be utilized for preparing display panel 25 for each cycle of nine pulse packets. For example, the sync pulse on the tape which occurs after each ninth pulse packet may be used to reset all the light relays at once. Alternately pulses from decoder 24 fed to display panel 25 over conductor 40 may reset the light controlling relay asynchronously. For example, a one count in transducer counter may be used to reset the relays associated with column 3; the two count to reset column 4, etc.

Throughout this description it has been assumed that the transducers from which the tape recording was made were all at the same relative height with respect to the submarine. In actual practice, however, this is not true and some correction factor must be used to give mean keel height. This correction factor may be incorporated into each transducer before it is placed on the submarine. In other words, the gate on time of each transducer may be initiated a predetermined time before or after actual emission of a sonar signal depending on the correction necessary.

Alternately this correction may take place in the digital-to-digital converter of this invention. This may be done by inserting into depth counter 12 an artificial count for each of the cyclically repeating nine pulse packets corresponding to each of the respective transducers.

Obviously many modifications and variations of the present invention are possible in the light of the above teachings. It is therefore to be understood, that within the scope of the appended claims, the invention may be practiced otherwise than as specifically described.

What is claimed is:

1. A digital-to-digital converter for indicating in visual form tape recorded sea surface scan date, comprising in combination:
   tape means having recorded thereon a plurality of pulse packets,
   tape reading means for sensing the pulses recorded on said tape means,
   first counter means connected to said tape reading means sequentially counting the pulses in each of said pulse packets and providing successive outputs representative of the number of pulses in successive ones of said pulse packets,
   second counter means,
   pulse generator means responsive to the termination of each of said pulse packets to produce a pulse advancing the count of said second counter means by one a predetermined time after said termination,
   display panel means comprising a plurality of columns of lights,
   switching circuit means connected to said first and second counter means and said display panel means connecting said successive outputs of said first counter means to a particular one of said columns of lights as determined by the count in said second counter means whereby each of said columns of lights indicates the number of pulses in a particular successive one of said pulse packets.

2. A digital-to-digital converter for indicating a visual form tape recorded sea surface scan date, comprising in combination:
   tape means having recorded thereon a plurality of pulse packets,
   tape reading means for sensing the pulses recorded on said tape means,
   first counter means connected to said tape reading means sequentially counting the pulses in each of said pulse packets providing outputs representative of the number of pulses in each of said pulse packets,
   second counter means providing an output indicative of the count registered therein,
   envelope generator means connected to said tape reading means providing an envelope pulse in response to each of said pulse packets as recorded on said tape means,
   pulse generator means connected between said envelope generator and said second counter means providing an output pulse in response to the termination of each of said envelope pulses advancing the count of said second counter means by one a predetermined time after said termination,
   display panel means comprising a plurality of groups of indicators,
   matrix circuit means connected to said first and second counter means and said display panel means connecting each successive output of said first counter means to a particular one of said groups of indicators in accordance with the count registered in said second counter means whereby the number of pulses in each of said pulse packets is indicated by a particular one of said groups of indicators.

3. A digital-to-digital converter according to claim 2 wherein said matrix circuit means comprises:
   a plurality of submatrices, each of said submatrices including a first plurality of conductor means connected to said second counter means, each conductor means being at a predetermined voltage when said second counter means registers a predetermined count,
   a second plurality of conductor means interconnecting said submatrices, each one of said second plurality of conductor means being connected to a corresponding one of said first plurality of conductor means,
   means connecting said first counter means with said second plurality of conductor means and providing a predetermined voltage on a particular combination of said second plurality of conductor means in accordance with the count registered by said first counter means,
   relay means disposed in each of said first plurality of conductor means energized when connected ones of said first and second plurality of conductor means are at said predetermined voltages,
   said indicators each being operatively associated with a corresponding one of said relay means and energized when said one relay means is energized whereby the combination of indicators energized is indicative of the count registered by said first counter means.

4. A digital-to-digital converter for indicating in visual form tape recorded sea surface scan data, comprising in combination:
   tape means having recorded thereon a plurality of pulse packets,
   tape reading means for sensing the pulses recorded on said tape means,
   first counter means connected to said tape reading means sequentially counting the pulses in each of said pulse packets and providing successive outputs representative of the number of pulses in each of said pulse packets,
   second counter means providing an output indicative of the count registered therein,
   envelope generator means connected to said tape reading means providing an envelope pulse output in response to each of said pulse packets as recorded on said tape means,
   gate generator means connected to said envelope generator providing a gating output pulse in response to the termination of each of said envelope pulses,
   pulse generator means connected between said gate generator means and said second counter means providing a pulse in response to the termination of said gating output pulse for advancing the count of said second counter means by one,
   means connected to said second counter means resetting said second counter means to a one count state,
   display panel means comprising a plurality of groups of indicators,
   matrix circuit means connected between said first counter means and said display panel means selectively connecting each of the outputs of said first counter means to said display panel means, "and" circuit means connected to said second counter means and said gate generator means and to said matrix circuit means providing an input indicative of the count registered in said first counter means to said matrix circuit means when said gating output pulse is present to cause said matrix circuit means to connect each successive output of said first counter means to a particular one of said groups of indicators in accordance with the count registered in said second counter means whereby the number of pulses in each of said pulse packets is indicated by a particular one of said groups of indicators.

5. A digital-to-digital converter according to claim 4 wherein said matrix circuit means comprises:

a plurality of submatrices, each of said submatrices including a first plurality of conductor means connected to said second counter means, each conductor means being at a predetermined voltage when said second counter means registers a predetermined count, a second plurality of conductor means interconnecting said submatrices, each one of said second plurality of conductor means being connected to a corresponding one of said first plurality of conductor means, means connecting said first counter means with said second plurality of conductor means and providing a predetermined voltage on a particular combination of said second plurality of conductor means in accordance with the count registered by said first counter means, relay means disposed in each of said first plurality of conductor means energized when connected ones of said first and second plurality of conductor means are at said predetermined voltages, said indicators each being operatively associated with a corresponding one of said relay means and energized when said one relay means is energized whereby the combination of indicators energized is indicative of the count registered by said first counter means.

6. A digital-to-digital converter for indicating in visual form tape recorded sea surface scan data, comprising in combination:

tape means having recorded thereon a plurality of pulse packets, tape reading means for sensing the pulses recorded on said tape means, first counter means connected to said tape reading means sequentially counting the pulses in each of said pulse packets and providing successive outputs representative of the number of pulses in each of said pulse packets, second counter means providing an output indicative of the count registered therein, envelope generator means connected to said tape reading means providing an envelope pulse output in response to each of said pulse packets as recorded on said tape means, gate generator means connected to said envelope generator providing a gating output pulse in response to the termination of each of said envelope pulses, pulse generator means connected between said gate generator means and said second counter means providing a pulse in response to the termination of said gating output pulse for advancing the count of said second counter means by one, means connected to said second counter means resetting said second counter means to a one count state, circuit means connected between said envelope generator means and said second counter means advancing the count of said second counter means by one when a pulse packet is missing, display panel means comprising a plurality of groups of indicators, matrix circuit means connected between said first counter means and said display panel means selectively connecting each of the outputs of said first counter means to said display panel means, "and" circuit means connected to said second counter means and said gate generator means and to said matrix circuit means providing an input indicative of the count registered in said first counter means to said matrix circuit means when said gating output pulse is present to cause said matrix circuit means to connect each successive output of said first counter means to a particular one of said groups of indicators in accordance with the count registered in said second counter means whereby the number of pulses in each of said pulse packets is indicated by a particular one of said groups of indicators.

7. A digital-to-digital converter according to claim 6 wherein said matrix circuit means comprises:

a plurality of submatrices, each of said submatrices including a first plurality of conductor means connected to said second counter means, each conductor means being at a predetermined voltage when said second counter means registers a predetermined count, a second plurality of conductor means interconnecting said submatrices with each one of said second plurality of conductor means being connected to a corresponding one of said first plurality of conductor means, means connecting said first counter means with said second plurality of conductor means and providing a predetermined voltage on a particular combination of said second plurality of conductor means in accordance with the count registered by said first counter means, relay means disposed in each of said first plurality of conductor means energized when connected ones of said first and second plurality of conductor means are at said predetermined voltages, said indicators each being operatively associated with a corresponding one of said relay means and energized when said one relay means is energized whereby the combination of indicators energized is indicative of the count registered by said first counter means.

8. A digital-to-digital converter for indicating in visual form tape recorded sea surface scan data, comprising in combination:

tape means having recorded thereon a plurality of pulse packets, tape reading means for sensing the pulses recorded on said tape means, first counter means connected to said tape reading means sequentially counting the pulses in each of said pulse packets and providing successive outputs representative of the number of pulses in each of said pulse packets, second counter means providing an output indicative of the count registered therein, envelope generator means connected to said tape reading means providing an envelope pulse output in response to each of said pulse packets as recorded on said tape means, gate generator means connected to said envelope generator providing a gating output pulse in response to the termination of each of said envelope pulses, pulse generator means connected between said gate generator means and said second counter means providing a pulse in response to the termination of said gating output pulse for advancing the count of said second counter means by one, means connected to said second counter means resetting said second counter means to a one count state, display panel means comprising a plurality of groups of indicators, matrix circuit means connected between said first counter means and said display panel means selectively connecting each of the outputs of said first counter means to said display panel means, "and" circuit means connected to said second counter means and said gate generator means and to said matrix circuit means providing an input indicative of the count registered in said first counter means to said matrix circuit means when said gating output pulse is present to cause said matrix circuit means to connect each successive output of said first counter means to a particular one of said groups of indicators in accordance with the count registered in said second counter means, continuous pulse detector means connected between said envelope generator means and said "and" circuit for preventing said "and" circuit from passing an output from said second counter means to said matrix circuit means when the width of said pulse envelope pulse exceeds a predetermined amount whereby the output from said first counter means is prevented from being displayed on said display panel means.

9. A digital-to-digital converter according to claim 8 wherein said matrix circuit means comprises:

a plurality of submatrices, each of said submatrices including a first plurality of conductor means connected to said second counter means, each conductor means being at a predetermined voltage when said second counter means registers a predetermined count, a second plurality of conductor means interconnecting said submatrices, each one of said second plurality of conductor means being connected to a corresponding one of said first plurality of conductor means, means connecting said first counter means with said second plurality of conductors means and providing a predetermined voltage on a particular combination of said second plurality of conductor means in accordance with the count registered by said first counter means, relay means disposed in each of said first plurality of conductor means energized when connected ones of said first and second plurality of conductor means are at said predetermined voltages, said indicators each being operatively associated with a corresponding one of said relay means and energized when said one relay means is energized whereby the combination of indicators energized is indicative of the count registered by said first counter means.

10. A digital-to-digital converter for indicating in visual form tape recorded sea surface scan data, comprising in combination:

tape means having recorded thereon a plurality of pulse packets, tape reading means for sensing the pulses recorded on said tape means, first counter means connected to said tape reading means sequentially counting the pulses in each of said pulse packets and providing successive outputs representative of the number of pulses in each of said pulse packets, second counter means providing an output indicative of the count registered therein, envelope generator means connected to said tape reading means providing an envelope pulse output in response to each of said pulse packets as recorded on said tape means, circuit means connected between said envelope generator means and said second counter means advancing the count of said second counter means by one when a pulse packet is missing, gate generator means connected to said envelope generator providing a gating output pulse in response to the termination of each of said envelope pulses, pulse generator means connected between said gate generator means and said second counter means providing a pulse in response to the termination of said gating output pulse for advancing the count of said second counter means by one, means connected to said second counter means resetting said second counter means to a one count state, display panel means comprising a plurality of groups of indicators, matrix circuit means connected between said first counter means and said display panel means selectively connecting each of the outputs of said first counter means to said display panel means, "and" circuit means connected to said second counter means and said gate generator means and to said matrix circuit means providing an input indicative of the count registered in said first counter means to said matrix circuit means when said gating output pulse is present to cause said matrix circuit means to connect each successive output of said first counter means to a particular one of said groups of indicators in accordance with the count registered in said second counter means, continuous pulse detector means connected between said envelope generator means and said "and" circuit for preventing said "and" circuit from passing an output from said second counter means to said matrix circuit means when the width of said pulse envelope pulse exceeds a predetermined amount whereby the output from said first counter means is prevented from being displayed on said display panel means.

11. A digital-to-digital converter according to claim 10 wherein said matrix circuit means comprises:

a plurality of submatrices, each of said submatrices including a first plurality of conductor means connected to said second counter means, each conductor means being at a predetermined voltage when said second counter means registers a predetermined count, a second plurality of conductor means interconnecting said submatrices, each one of said second plurality of conductor means being connected to a corresponding one of said first plurality of conductor means, means connecting said first counter means with said second plurality of conductor means and providing a predetermined voltage on a particular combination of said second plurality of conductor means in accordance with the count registered by said first counter means, relay means disposed in each of said first plurality of conductor means energized when connected ones of said first and second plurality of conductor means are at said predetermined voltages, said indicators each being operatively associated with a corresponding one of said relay means and energized when said one relay means is energized whereby the combination of indicators energized is indicative of the count registered by said first counter means.

12. In a digital-to-digital converter:

first counter means, second counter means, matrix circuit means comprising a plurality of submatrices, each of said submatrices including a first plurality of conductor means connected to said second counter means, each conductor means being at a predetermined voltage when said second counter means registers a predetermined count, a second plurality of conductor means interconnecting said submatrices, each one of said second plurality of conductor means being connected to a corresponding one of said first plurality of conductor means, means connecting said first counter means with said second plurality of conductor means and providing a predetermined voltage on a particular combination of said second plurality of conductor means in accordance with the count registered by said first counter means, relay means disposed in each of said first plurality of conductor means energized when connected ones of said first and second plurality of conductor means are at said predetermined voltages, a plurality of indicators each operatively associated with a corresponding one of said relay means and energized when said one relay means is energized whereby the combination of indicators energized is indicative of the counts registered by said first and second counter means.

References Cited by the Examiner
UNITED STATES PATENTS 2,796,596  6/1957  Kenosian _____ 340—167
3,145,374  8/1964  Benner et al. _____ 340—183

NEIL C. READ, *Primary Examiner.*
A. J. KASPER, *Assistant Examiner.*